United States Patent [19]

Eppler

[11] 4,312,951

[45] Jan. 26, 1982

[54] LOW-MELTING, LEAD-FREE CERAMIC FRITS

[75] Inventor: Richard A. Eppler, Timonium, Md.

[73] Assignee: Mobay Chemical Corporation, Pittsburgh, Pa.

[21] Appl. No.: 73,609

[22] Filed: Sep. 7, 1979

[51] Int. Cl.$^3$ .................... C03C 1/00; C03C 5/00; C03C 3/08

[52] U.S. Cl. .................... 501/24; 428/428; 428/432; 501/25; 501/26; 501/59; 501/63; 501/77; 501/79

[58] Field of Search .................... 106/48, 54, 52

[56] References Cited

U.S. PATENT DOCUMENTS

| | | | |
|---|---|---|---|
| 2,414,633 | 1/1947 | Bryant | 106/48 |
| 2,588,250 | 3/1952 | Kopelman et al. | 106/48 |
| 2,748,006 | 5/1956 | Kreidw et al. | 106/54 |
| 3,458,344 | 7/1969 | Little et al. | 106/48 X |
| 4,055,703 | 10/1977 | Rinehart | 106/52 X |
| 4,172,733 | 10/1979 | Moritsu | 106/54 X |
| 4,221,824 | 9/1980 | Leonard et al. | 106/48 X |

FOREIGN PATENT DOCUMENTS 589225  1/1978  U.S.S.R. .................... 106/52

*Primary Examiner*—Helen M. McCarthy
*Attorney, Agent, or Firm*—Gene Harsh; Joseph C. Gil; Lyndanne M. Whalen

[57] ABSTRACT

Disclosed are various ceramic frits which have a unique combination of low solubility, low-melting temperature, and freedom from lead oxide. They are formed from selected compositions in the alkali—$ZnO$—$Al_2O_3$—$B_2O_3$—$P_2O_5$—$SiO_2$—$TiO_2$—F system.

7 Claims, No Drawings

LOW-MELTING, LEAD-FREE CERAMIC FRITS

BACKGROUND OF THE INVENTION

Various ceramic uses require low-melting ceramic frit which advantageously can be applied to a substrate and fused into a ceramic coating at a temperature of about 550° C. to 700° C. Low-melting and durable glass frit formulations are highly desirable for uses such as vitrifiable glass decorating colors, glass-to-metal sealing, and vitreous coatings. Low-melting frits have an incipient fusion point less than about 475° C. as measured by the dilatometer method of coefficient of thermal expansion. The durability of a glass frit can be measured by exposing glass frit powder to various attacking agents for a specified test period and at a specified temperature. For instance, a glass frit powder sample of minus 100 plus 200 mesh particle size, exposed to distilled water at 100° C. for one hour and exhibiting total solubility of frit in water of less than 0.6% by weight, would be considered durable.

It is well known in the art of ceramics that the two properties of low-melting and high durability are generally opposing physical properties, and hence, frit materials simultaneously exhibiting both low-melting and high durability are difficult to achieve. Conventional approaches to compounding frits which are simultaneously low-melting and durable include lead borosilicate system such as disclosed in U.S. Pat. Nos. 3,258,350; 2,642,633; and 3,404,027; or lead zinc borosilicate systems such as disclosed in U.S. Pat. Nos. 3,873,330 and 3,258,350. Lead borosilicate systems, however, are based on highly toxic lead oxide as a major constituent which must be carefully handled to avoid ingestion or inhalation. Accordingly, a need exists for nontoxic, lead-free frit systems which are both low-melting and highly durable. Some alkali borosilicate glasses are adequately low-melting, but are not durable, in addition to exhibiting very high expansion. Other alkali borosilicates, as used in Pyrex and Kimax brand glasses, are durable glasses, but they exhibit high-melting properties. Blending or an admixture of such borosilicates does not provide the desired low-melting and durability characteristics. Alkali phosphate glasses or arsenic-selenium-tellurium-antimony glasses provide adequate low-melting properties but exhibit very poor durability to the extent that such frits are soluble in water at moderate temperatures. Zinc borosilicates such as disclosed in U.S. Pat. No. 3,113,878 can provide moderately durable and moderate melting characteristics; however, such systems do not produce satisfactory low-melting, durable frits particularly useful in applications requiring low-melting and high durability properties simultaneously.

It now has been found that a certain range of compositions within the frit system comprising alkali, zinc oxide, boron oxide, phosphorus oxide, silicon oxide, titanium oxide, and fluorine surprisingly provides highly desirable lead-free ceramic frits exhibiting low-water solubility, high durability and low-melting characteristics. These and other advantages of this invention will become more apparent from the Detailed Description of the Invention.

SUMMARY OF THE INVENTION

A lead-free, low-melting and durable glass frit composition can be produced by mixing together conventional materials such as ceramic oxide, carbonate, fluoride, or silico fluoride raw materials to yield upon melting a glass formulation comprising on a 100 parts (exclusive of F) weight basis:

13–24 parts alkali oxide
14–27 parts $B_2O_3$
2–8 parts $Al_2O_3$
35–55 parts $SiO_2$
0.75–4 parts F
0–5 parts $P_2O_5$
0–11 parts ZnO
0–6 parts $TiO_2$ provided that the sum of $TiO_2$, ZnO, and $P_2O_5$ is greater than 5 parts, and further including at least two of these three oxides.

DETAILED DESCRIPTION OF THE INVENTION

This invention pertains to vitreous ceramic frits which are suitable for use as components in vitrifiable glass decorating colors, ceramic coatings, and in glass-to-metal sealing operations. These materials are prepared by mixing together oxide producing materials such as alumina, conventional ceramic oxides, carbonate, fluoride, or silico fluoride raw materials in such amounts as to yield upon melting a glass formulation having an oxide analysis as given below. Suitable raw materials can include, for example, alumina, anhydrous borax, boric acid, calcium carbonate, lithium carbonate, magnesium oxide, moly-bdenum trioxide, monoammonium phosphate, potassium carbonate, anhydrous potassium carbonate, potassium silicofluoride, silica, sodium carbonate, sodium silicofluoride, sodium tripolyphosphate, titania, zinc oxide, zircon, and similar raw materials as further illustrated in the examples. The raw material mix can be charged into a glass-melting furnace at temperatures of 1000° to 1200° C. to produce fused glass. The glass is subsequently fritted, either by pouring into water or by pouring through a pair of water-cooled rolls. If necessary, the frit can then be comminuted to powder by conventional grinding operations. The result of this processing is a homogeneous glass frit having a formulation, in parts by weight on 100 parts weight basis exclusive of F consisting essentially of: 0–22 parts $Na_2O$, 0–6 parts $Li_2O$, 0–22 parts $K_2O$, with the further provision that total alkali is 13–24 parts, 14–27 parts $B_2O_3$, 2–8 parts $Al_2O_3$, 35–55 parts $SiO_2$, and 0.75–4 parts F, 0–5 parts $P_2O_5$, 0–11 parts ZnO, 0–6 parts $TiO_2$, with the further provision that the sum of $TiO_2$, ZnO, and $P_2O_5$, is not less than 5 and at least two oxides of these three are present.

The inventive glass or frit materials which meet these requirements are as follows on a 100-weight part basis:

| Component | Broad Weight Parts | Preferred Weight Parts |
| --- | --- | --- |
| $Na_2O$ | 0–22 | 13–22 |
| $Li_2O$ | 0–6 | 0–3 |
| $K_2O$ | 0–22 | 0 | provided that the sum of the foregoing alkalis are within the range of broadly 13–24 weight parts and preferably 15–24 weight parts;

| | | |
| --- | --- | --- |
| $B_2O_3$ | 14–27 | 18–22 |
| $Al_2O_3$ | 2–8 | 3–8 |

| -continued | | |
|---|---|---|
| SiO$_2$ | 35-55 | 40-46 |
| MoO$_3$ | 0-2 | 0-1 |
| F | 0.75-4 | 1-3 |
| P$_2$O$_5$ | 0-5 | 2-3 |
| ZnO | 0-11 | 7-11 |
| TiO$_2$ | 0-6 | 0-4 | provided that the sum of TiO$_2$, ZnO, P$_2$O$_5$ is not less than 5, and at least two of these three oxides are present; and further provided that the sum of all parts exclusive of F totals to 100 parts.

In addition to the oxides listed, MgO or CaO may be present up to 2.0 weight parts, although they are not desirable unless required for the properties of a specific application, since MgO and CaO are deleterious to the melting temperature. Similarly, up to 4.0 weight parts of zirconia may be in the formulation if necessary to give improved alkaline resistance, although the inclusion of zirconia is not preferred. In compounding the raw batch from which this frit or glass is made, substantially higher concentrations of fluorine must be added in order to allow for volatilization. From 2.0 to 13.0 parts of fluorine must be added in the broad weight parts, and preferably 5.0 to 11.0 weight parts must be added, to give the called for fluorine in the indicated final frit. In addition to the oxides mentioned, all other divalent ions such as cadmium oxide, strontium oxide, and barium oxide should be avoided. Refractory oxides such as tin oxide and colored oxides such as chromium oxide, iron oxide, vanadium pentoxide, and copper oxide, etc., should be avoided unless the application permits a colored product.

When the concentration of alkali is reduced below 13 weight parts, the requisite low melting cannot be achieved. On the other hand, when the concentration of alkali is increased above 24 weight parts, the solubility of the frit becomes unacceptable. Similarly, when the concentration of boron oxide is reduced below 14 weight parts, the requisite low melting cannot be achieved; and when boron oxide is increased above 27 weight parts, the solubility becomes excessive. In order that the requisite low-melting behavior is achieved, at least two oxides chosen from P$_2$O$_5$, ZnO, and TiO$_2$ must be present in measurable amounts. The aggregate concentration of P$_2$O$_5$ plus ZnO plus TiO$_2$ must be not less than 5 weight parts. When the concentration of P$_2$O$_5$ is increased above 5 parts, the solubility becomes excessive. When the concentration of zinc oxide is increased above 11 parts, either opacification is encountered or the concentration of other fluxes has been reduced to the extent that the adequate low melting can no longer be achieved. When the concentration of titanium dioxide is increased above 6 parts, opacification is encountered. When the concentration of alumina is reduced below 2%, opacification is encountered. When it is increased above 8%, it is no longer possible to achieve the requisite low melting. When the concentration of silica is reduced below 35%, the solubility of the frit becomes excessive and in some cases opacification is encountered. When the concentration of silica is increased above 55%, the requisite low melting is no longer achievable. When the fluorine is reduced below ¾ of a percent, the requisite low melting is no longer achievable. It is not practical to add sufficient fluorine to raise the retained amount above 4 parts, without lowering the smelting temperature to undesirable levels.

The frits described herein have a number of uses including vitrifiable glass decorating colors, glass-to-metal seals, and coating formulations. For example, to use these materials as a glass decorating color, a slip is prepared consisting of frit, titanium dioxide, and an alcohol-water mixture. This spray medium is then applied to the exterior of a glass jar or a lightbulb and then fired at 680° C. for 3 minutes. The result is a smooth vitreous coating which will resist attack from either hydrogen sulfide or citric acid at room temperature. The materials of this invention are substantial improvements over lead borosilicates and lead zinc borosilicates as well as similar systems with titania added. In the prior art systems, lead oxide is a major constituent which must be handled with care during manufacture so as to avoid ingestion or inhalation. Accordingly, the lead-free glasses or frits of this invention are free of lead oxide in addition to providing the requisite low-melting and durability characteristics.

The following examples show ways in which this invention has been practiced, but should not be construed as limiting the same:

EXAMPLE 1

The raw materials necessary to yield 15 parts of Na$_2$O, 2 parts of Li$_2$O, 7.5 parts of ZnO, 20 parts of B$_2$O$_3$, 2.5 parts of P$_2$O$_5$, 4 parts of Al$_2$O$_3$, 45 parts of SiO$_2$, 4 parts of TiO$_2$, and 11 parts of F (including volatilized F) were weighed out and blended in a V-cone blender with an intensifier bar. In this example, the raw materials used are as follows:

| Raw Materials | Weight Parts |
|---|---|
| Morgan 200-Mesh Supersil Silica (Pennsylvania Glass Sand Company) | 26.1 |
| Pyrobor Anhydrous Borax (Kerr-McGee Chemical Corp.) | 7.6 |
| Canfelzo 216 Zinc Oxide (Pigment and Chemical Co., Ltd.) | 5.8 |
| Boric Acid (U.S. Borax and Chemical Corp.) | 18.3 |
| Sodium Silicofluoride (Agrico Chemical Co.) | 28.9 |
| Technical Grade Lithium Carbonate (Foote Mineral Company) | 3.8 |
| Titanox 3030 Titania (NL Industries) | 3.1 |
| A-1 Alumina (Aluminum Company of America) | 3.1 |
| Technical Grade Monoammonium Phosphate (Tilley Chemical Co.) | 3.2 |

After blending, the raw materials were then melted at 1125° C. for 30 minutes. The resulting glass frit was poured into water and then dried. The dried frit was placed in a ball mill and reduced to a powder, testing 5% retained on a 200-mesh Tyler Screen (95% passing through). The resulting frit had the formula 15 parts Na$_2$O, 2 parts Li$_2$O, 7.5 parts ZnO, 20 parts B$_2$O$_3$, 2.5 parts P$_2$O$_5$, 4 parts Al$_2$O$_3$, 45 parts SiO$_2$, 4 parts TiO$_2$, and 2.8 parts F. The frit had an incipient fusion point as measured on a dilatometer of 455° C. and a solubility in water of 0.15%, measured by exposure to water at 100° C. for one hour. The coefficient of thermal expansion was 11.2 cm/cm°C. The fluidity of this frit is also indicated by the results of the so-called donut test (for further description see Amer. Cer. Soc. Bull. 53: 443-45, 1974) wherein donut-shaped specimens of pressed powder are heated in the furnace until appreciable softening occurs. The diameter of the inner hole of the donut is then measured. The results are then adjusted to a common standard for comparison purposes. The result for this frit is 1.00. By comparison, materials which are marginal for the uses to which these products are to be put have a donut reading of approximately 3.25.

EXAMPLE 2

Nienty-two parts of the frit prepared in Example 1 were mixed with 8 parts anatase, 24 parts water, 8 parts of denatured ethyl alcohol, 0.187 parts of sodium nitrite, 0.061 parts Triton X-100 wetting agent, 0.062 octyl alcohol, and 2 parts of butyl carbitol. This mixture was sprayed onto the exterior of a lightbulb and fired at 670° C. for 3 minutes. The result was a white coating on a lightbulb which withstands 15 minutes' exposure to either hydrogen sulfide or citric acid without deterioration of the coating.

EXAMPLES 3-15

The raw materials necessary to yield the batches given in parts by weight in Table I were separately weighed out and blended in a V-cone blender with an intensifier bar. The amount of fluorine added including vaporized fluorine is that listed under "F-in-batch" in Table II. These frits were then melted at 1125° C. for 30 minutes. The resulting glass frits were poured into water and then dried. The dried frit was placed in a ball mill and reduced to a powder, testing 5% retained on a 200-mesh Tyler Screen. The resulting frits had formulas as given in Table II with the fluorine at the level given in the row "F-in-frit". The properties of these frits are also given in Table II. In the indicated compositions, donut test reading was considerably less than 3.25, the incipient fusion point is less than 475° C., and the solubility is less than 0.6%.

TABLE I

| Raw Material Examples | 3 | 4 | 5 | 6 | 7 | 8 | 9 | 10 | 11 | 12 | 13 | 14 | 15 |
|---|---|---|---|---|---|---|---|---|---|---|---|---|---|
| Morgan 200-Mesh Supersil Silica | 27.1 | 26.4 | 24.8 | 19.7 | 37.8 | 26.1 | 30.2 | 32.5 | 18.6 | 19.6 | 23.4 | 28.2 | 26.2 |
| Pyrobor Anhydrous Borax | 8.3 | 17.9 | 19.1 | 15.6 | 26.8 | 7.6 | 7.8 | 20.7 | — | 16.0 | 7.7 | 24.4 | 7.6 |
| Light Soda Ash | — | — | 1.1 | — | — | — | — | — | — | — | — | — | — |
| Canfelzo 216 Zinc Oxide | 6.1 | 2.6 | 8.9 | 7.1 | 7.0 | 4.3 | 6.0 | 6.5 | 7.8 | 8.2 | 8.0 | — | 7.8 |
| Boric Acid | 18.5 | 7.0 | — | 14.9 | — | 18.3 | 12.6 | 5.3 | 22.2 | 8.1 | 11.6 | — | 11.5 |
| No. 4 Whiting | — | — | — | — | — | — | — | — | — | — | — | — | 2.9 |
| Sodium Silicofluoride | 30.0 | 30.2 | 31.4 | 29.1 | 12.5 | 28.9 | 29.8 | 20.4 | — | 29.0 | 29.4 | 31.2 | 29.0 |
| Technical Grade Lithium Carbonate | — | 5.0 | 5.8 | 4.7 | 4.6 | 3.8 | 4.0 | 4.3 | 5.2 | 10.8 | 3.9 | 6.0 | 3.9 |
| Titanox 3030 Titania | — | 3.3 | 3.0 | 2.5 | 3.7 | 3.1 | 3.5 | 3.4 | 2.4 | 2.5 | 4.8 | 3.4 | 3.1 |
| Calcined Potassium Carbonate | — | — | — | — | — | — | — | — | 3.3 | — | — | — | — |
| A-1 Alumina | 6.5 | 3.3 | 3.0 | 2.5 | 3.7 | 3.1 | 3.5 | 3.4 | 2.4 | 2.5 | 4.8 | 3.4 | 1.6 |
| Screened Technical Molybdic Oxide | — | 0.9 | — | — | — | — | — | — | — | — | — | — | — |
| Potassium Silicofluoride | — | — | — | — | — | — | — | 32.6 | — | — | — | — | — |
| Monoammonium Phosphate, Technical Grade | — | 3.3 | — | 4.0 | 0.2 | 3.2 | 2.5 | 3.5 | 3.0 | 3.2 | 6.4 | 2.1 | 6.4 |
| Sodium Tripolyphosphate, Food Grade | 3.5 | — | 2.8 | — | 3.8 | — | — | — | — | — | — | 1.4 | — |
| Magnesium Oxide, Grade 569 | — | — | — | — | — | 1.6 | — | — | — | — | — | — | — |
| Anhydrous Boric Acid | — | — | — | — | — | — | — | — | 2.5 | — | — | — | — |

TABLE II

| Example No. | 1 | 3 | 4 | 5 | 6 | 7 | 8 | 9 | 10 | 11 | 12 | 13 | 14 | 15 |
|---|---|---|---|---|---|---|---|---|---|---|---|---|---|---|
| $Na_2O$ (Parts by wt.) | 15 | 17.0 | 18.7 | 21.1 | 18.1 | 15.0 | 15.0 | 15.0 | 15.0 | — | 18.3 | 15.0 | 21.6 | 15.0 |
| $Li_2O$ | 2 | — | 2.5 | 2.8 | 2.4 | 2.0 | 2.0 | 2.0 | 2.0 | 2.8 | 5.6 | 2.0 | 2.9 | 2.0 |
| $K_2O$ | — | — | — | — | — | — | — | — | — | 21.1 | — | — | — | — |
| $B_2O_3$ | 20 | 20.0 | 20.0 | 15.6 | 24.4 | 20.0 | 20.0 | 15.6 | 20.0 | 20.0 | 20.0 | 15.0 | 20.0 | 15.0 |
| $P_2O_5$ | 2.5 | 2.5 | 2.5 | 1.9 | 3.1 | 2.5 | 2.5 | 1.9 | 2.5 | 2.5 | 2.5 | 5.0 | 2.5 | 5.0 |
| ZnO | 7.5 | 7.5 | 3.3 | 10.5 | 9.0 | 7.5 | 5.5 | 7.5 | 7.5 | 10.5 | 10.5 | 10.0 | — | 10.0 |
| $TiO_2$ | 4 | — | 4.0 | 3.6 | 3.2 | 4.0 | 4.0 | 4.4 | 4.0 | 3.2 | 3.2 | 6.0 | 4.0 | 4.0 |
| $Al_2O_3$ | 4 | 8.0 | 4.0 | 3.6 | 3.2 | 4.0 | 4.0 | 4.4 | 4.0 | 3.2 | 3.2 | 6.0 | 4.0 | 2.0 |
| $SiO_2$ | 45 | 45.0 | 44.0 | 40.8 | 36.6 | 45.0 | 45.0 | 49.2 | 45.0 | 36.6 | 36.6 | 41.0 | 45.0 | 45.0 |
| $MoO_3$ | — | — | 1.0 | — | — | — | — | — | — | — | — | — | — | — |
| F { In Batch | | 11.0 | 11.0 | 11.0 | 11.0 | 4.0 | 11.0 | 11.0 | 7.0 | 11.0 | 11.0 | 11.0 | 11.0 | 11.0 |
| F { In Frit | 2.8 | 2.8 | 2.8 | 2.8 | 2.8 | 1.3 | 2.8 | 2.8 | 2.6 | 2.8 | 2.8 | 2.8 | 2.8 | 2.8 |
| CaO | — | — | — | — | — | — | — | — | — | — | — | — | — | 2.0 |
| MgO | — | — | — | — | — | — | 2.0 | — | — | — | — | — | — | — |
| Properties Found | | | | | | | | | | | | | | |
| Donut Test | 3.09 | 0.75 | 0.46 | 0.71 | 1.62 | 1.85 | 1.77 | 0.91 | 1.48 | 0.60 | 1.98 | 1.94 | 1.67 | |
| Incipient Fusion Point | 470° C. | 430° C. | 420° C. | 455° C. | 470° C. | 465° C. | 460° C. | 460° C. | | | | | | |
| Solubility (%) | 0.22 | 0.35 | 0.40 | 0.27 | 0.15 | 0.13 | 0.21 | 0.15 | | | | | | |
| Coefficient of Expansion ($\times 10^{-6}$ cm/cm °C.) | 9.8 | 13.9 | 13.3 | 10.8 | 9.9 | 11.1 | 11.6 | 11.0 | | | | | | |

EXAMPLES 16-22

By contrast, in Table III will be found several examples of materials which are, in general, similar to those in Table II, but which in one or more particular frit components differ from the compositional specifications given in this invention. Although prepared in a manner similar to that described above, the results given in Table III show that these compositions do not have the requisite combination of low melting plus low solubility.

TABLE III

| Example No. | 16 | 17 | 18 | 19 | 20 | 21 | 22 |
|---|---|---|---|---|---|---|---|
| Parts by Weight | | | | | | | |
| $Na_2O$ | 13.5 | 16.3 | 17.0 | 17.0 | 20.5 | 15.0 | 24.2 |
| $Li_2O$ | — | — | — | — | — | 2.0 | 3.2 |
| $K_2O$ | — | — | — | — | — | — | — |
| $B_2O_3$ | 25.5 | 23.7 | 20.5 | 20.0 | 18.5 | 33.3 | 20.0 |

TABLE III-continued

| Example No. | 16 | 17 | 18 | 19 | 20 | 21 | 22 |
|---|---|---|---|---|---|---|---|
| $P_2O_5$ | — | — | — | 2.5 | 2.5 | 4.2 | 2.5 |
| ZnO | 11.0 | 13.2 | 7.5 | 7.5 | 9.0 | 7.5 | 12.1 |
| $TiO_2$ | — | — | — | — | — | 2.9 | 2.9 |
| $Al_2O_3$ | — | — | 8.0 | — | 3.7 | 2.9 | 2.9 |
| $SiO_2$ | 50.0 | 46.8 | 47.0 | 53.0 | 45.8 | 32.2 | 32.2 |
| $MoO_3$ | — | — | — | — | — | — | — |
| F In Batch | — | — | 11.0 | 11.0 | — | 11.0 | 11.0 |
| F In Frit | — | — | 2.8 | 2.8 | — | 2.8 | 2.8 |
| Properties Found | | | | | | | |
| Fluidity Donut Test | 9.3 | 5.8 | 6.7 | 7.6 | 8.6 | 0.37 | 0.11 |
| Incipient Fusion Point | | | | | | 450° C. | 400° C. |
| Solubility (%) | | | | | | 1.99 | 1.63 |
| Coefficient of Expansion ($\times 10^{-6}$ cm/cm °C.) | | | | | | 11.0 | 15.1 |

The foregoing examples illustrate the merits of this invention with respect to specific frit compositions which exhibit the combination of low melting and high durability, but are not intended to be limiting except by the appended claims.

I claim:

1. A lead-free, low melting and durable glass frit composition adapted to have an incipient fusion point below about 475° C. and a solubility in water of less than 0.6 percent; measured by exposure to water at 100° C. for one hour, the glass frit consisting essentially of on a weight basis:
   13 to 24 parts alkali oxide selected from 0 to 22 parts $Na_2O$, 0 to 6 parts $Li_2O$, and 0 to 22 parts $K_2O$;
   14 to 27 parts $B_2O_3$;
   2 to 8 parts $Al_2O_3$;
   35 to 55 parts $SiO_2$;
   0.75 to 4 parts F;
   at least 5 parts other oxide selected from 0 to 6 parts $TiO_2$, 0 to 11 parts ZnO, and 0 to 5 parts $P_2O_5$, provided that at least two of said oxides are included in measurable amounts; and
   provided that the sum of all parts, exclusive of F, totals 100 weight parts.

2. The lead-free glass frit composition in claim 1, comprising:
   13 to 22 parts $Na_2O$;
   0 to 3 parts $Li_2O$;
   0 to 1 part $K_2O$;
   18 to 22 parts $B_2O_3$;
   3 to 8 parts $Al_2O_3$;
   40 to 46 parts $SiO_2$;
   1 to 3 parts F;
   0 to 4 parts $TiO_2$;
   7 to 11 parts ZnO; and
   2 to 3 parts $P_2O_5$.

3. The lead-free glass frit composition in claim 1 containing 0 to 2 parts MgO.

4. The lead-free glass frit composition in claim 1 containing 0 to 2 parts CaO.

5. The lead-free glass frit composition in claim 1 containing 0 to 4 parts zirconia.

6. The lead-free glass frit composition in claim 1 containing 0 to 1 part $MoO_3$.

7. In a process for producing a durable glass frit composition by melting oxide producing batch materials at temperatures above about 1000° C. to produce glass frit, the improvement comprising:
   proportioning the batch materials to provide a glass frit having an oxide analysis based on 100 total weight parts consisting essentially of,
   13 to 24 parts alkali oxides selected from 0 to 22 parts $Na_2O$ plus 0 to 6 parts $Li_2O$ plus and 0 to 22 parts $K_2O$,
   14 to 27 parts $B_2O_3$,
   2 to 8 parts $Al_2O_3$,
   35 to 55 parts $SiO_2$,
   at least 5 parts other oxide selected from 0 to 6 parts $TiO_2$ plus 0 to 11 parts ZnO plus 0 to 5 parts $P_2O_5$ provided that at least two of said other oxides are included in measurable amounts; and
   including in said batch materials, fluorides containing between about 2 and 13 parts fluorine wherein a portion of said fluorine volatilizes to provide between 0.75 and 4 parts fluorine (F) in said glass frit, whereby said glass frit composition is lead free and has an incipient fusion point less than about 475° C. and a solubility in water of less than 0.6 percent; measured by exposure to water at 100° C. for one hour.

* * * * *